US009201658B2

(12) United States Patent
Kountanis et al.

(10) Patent No.: US 9,201,658 B2
(45) Date of Patent: Dec. 1, 2015

(54) BRANCH PREDICTOR FOR WIDE ISSUE, ARBITRARILY ALIGNED FETCH THAT CAN CROSS CACHE LINE BOUNDARIES

(71) Applicants: Ian D. Kountanis, Santa Clara, CA (US); Gerard R. Williams, III, Los Altos, CA (US); James B. Keller, Redwood City, CA (US)

(72) Inventors: Ian D. Kountanis, Santa Clara, CA (US); Gerard R. Williams, III, Los Altos, CA (US); James B. Keller, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 610 days.

(21) Appl. No.: 13/625,382

(22) Filed: Sep. 24, 2012

(65) Prior Publication Data

US 2014/0089647 A1    Mar. 27, 2014

(51) Int. Cl.
*G06F 9/38*      (2006.01)
*G06F 9/30*      (2006.01)

(52) U.S. Cl.
CPC ............ *G06F 9/3842* (2013.01); *G06F 9/3005* (2013.01); *G06F 9/30058* (2013.01); *G06F 9/38* (2013.01); *G06F 9/3844* (2013.01); *G06F 9/3848* (2013.01)

(58) Field of Classification Search
None
See application file for complete search history.

(56) References Cited

U.S. PATENT DOCUMENTS

| 5,732,243 | A  | * | 3/1998  | McMahan ............... 711/137 |
| 5,822,575 | A  |   | 10/1998 | Tran                            |
| 5,875,324 | A  |   | 2/1999  | Tran et al.                     |
| 6,279,107 | B1 |   | 8/2001  | Tran                            |
| 7,827,392 | B2 | * | 11/2010 | Smith et al. ............ 712/239 |

OTHER PUBLICATIONS

Daniel A. Jimenez, "Fast Path-Based Neural Branch Prediction," Appears in the Proceedings of the 36th Annual IEEE/ACM International Symposium on Microarchitecture (MICRO-36), Dec. 2003, pp. 1-10.
Andre Seznec, "The O-GEHL branch predictor," 2004, pp. 1-4.

* cited by examiner

*Primary Examiner* — Kenneth Kim
(74) *Attorney, Agent, or Firm* — Meyertons, Hood, Kivlin, Kowert & Goetzel, P.C.; Lawrence J. Merkel (57) ABSTRACT

In an embodiment, a processor may be configured to fetch N instruction bytes from an instruction cache (a "fetch group"), even if the fetch group crosses a cache line boundary. A branch predictor may be configured to produce branch predictions for up to M branches in the fetch group, where M is a maximum number of branches that may be included in the fetch group. In an embodiment, branch prediction values from multiple entries in each table may be read and respective branch prediction values may be combined to form branch predictions for up to M branches in the fetch group.

17 Claims, 5 Drawing Sheets

BRANCH PREDICTOR FOR WIDE ISSUE, ARBITRARILY ALIGNED FETCH THAT CAN CROSS CACHE LINE BOUNDARIES

BACKGROUND

1. Field of the Invention

This invention is related to the field of processors and, more particularly, to branch prediction in processors.

2. Description of the Related Art

One of the key factors affecting the performance of processors is the management of branch instructions (or more briefly, "branches"). A variety of branch predictors can be used to predict the direction (taken or not taken), the target address, etc. for branches, to allow the processor to fetch ahead of the branches. If the predictions are correct, the next instructions to be executed after each branch may already be preloaded into the processor's pipeline, which may enhance performance over fetching the instructions after executing each branch. Similarly, the next instructions can be speculatively executed and thus can be ready to retire/commit results when the branch is resolved (if the prediction is correct), further enhancing performance.

Branch predictors can be accessed in different fashions, depending on how early in the pipeline the branch predictors are accessed. Generally, the earlier in the pipeline that the predictor is accessed, the less information about the branch is available. For example, if the branch predictor is accessed in parallel with cache access for a fetch, the branch predictor can produce a prediction based on the fetch address. However, the location of the branch instruction is unknown and thus the branch must be located after fetch and the prediction associated with the branch. If the prediction is not taken, there may be another branch in the instructions fetched which could have been predicted but was not predicted.

SUMMARY

In an embodiment, a processor may be configured to fetch N instruction bytes from an instruction cache, even if the N instruction bytes cross a cache line boundary. A branch predictor in the processor may be configured to produce branch predictions for up to M branches in the N instruction bytes, where M is a maximum number of branches that may be included in the N instruction bytes for a first instruction set implemented by the processor. In some embodiments, the processor may also implement a second instruction set that may include more than M branches in the N instruction bytes, but the occurrence of more than M branches may be rare. In an embodiment, branch prediction accuracy may be increased by providing predictions for each branch in the N instruction bytes for most cases. The increased branch prediction accuracy may lead to increased performance.

In an embodiment, a branch direction predictor may be updated responsive to a misprediction and also responsive to the branch prediction being within a threshold of transitioning between predictions. To avoid a lookup to determine if the threshold update is to be performed, the branch predictor may detect the threshold update during prediction, and may transmit an indication with the branch. When the branch is executed, the misprediction update may be determined by the branch execution unit. The branch execution unit may transmit an update request responsive to either a branch misprediction or the indication with the branch indicating a threshold update.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
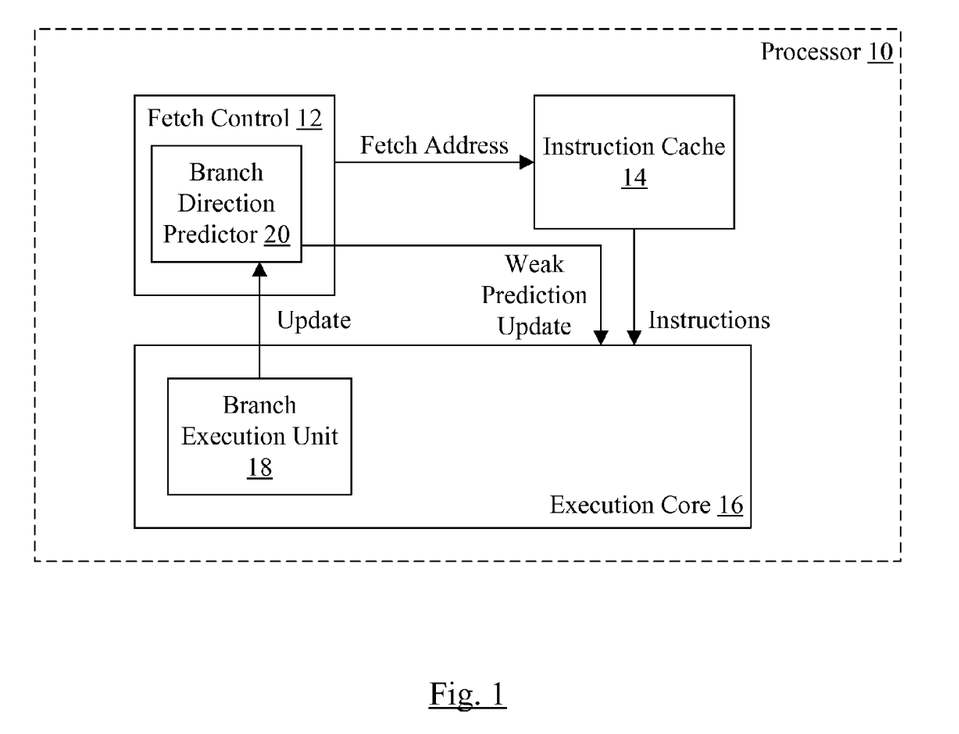
FIG. 1 is a block diagram of one embodiment of a processor.

Turning now to FIG. 1, a block diagram of one embodiment of a processor 10 is shown. In the illustrated embodiment, the processor 10 includes a fetch control unit 12, an instruction cache 14, and an execution core 16. The execution core 16 may include a branch execution unit 18, and the fetch control unit 12 may include a branch direction predictor 20. The fetch control unit may be configured to output a fetch group of instructions (in the event of a cache hit) to the execution core 16. The branch direction predictor 20 may be configured to generate weak prediction update indications for potential branches in the fetch group. The branch execution unit 18 may be configured to execute branches and to generate updates for the branch direction predictor 20. Additionally, the branch execution unit 18 may be configured signal mispredictions (not shown) to the fetch control unit 12 to cause the fetch control unit 12 to begin fetching at the correct fetch address based on the branch execution.

The fetch control unit 12 may be configured to generate fetch addresses by speculating on the instruction stream. Branch prediction is a factor in such speculation. Generally, branch prediction may refer to any mechanism for speculating on the result of one or more aspects of branch instruction execution. For example, the branch direction predictor 20 may predict the direction of a conditional branch (e.g. taken or not taken). A taken branch causes the next instruction in the instruction stream to be at the target address of a branch (although in some instruction sets there may be a delay slot instruction that is also executed sequential to the branch before fetching the target instruction). A not-taken branch causes the next instruction to be fetched at the sequential address of the branch (i.e. the fetch address of the branch plus the size of the branch, and again their may be a delay slot instruction). A conditional branch may be determined to be taken or not taken by evaluating one or more conditions specified by the conditional branch. The conditions may be based on a previous instruction's execution and/or a comparison specified by the branch instruction, in various instruction sets. The target address of the branch may be specified by other operands of the instruction. Some branch instructions may be indirect, where at least one of the operands specifying the target address is either a memory location or a register value. Other branches may specify the target address directly as a displacement in the instruction (added to the fetch address) or an immediate field specifying an absolute address. Indirect branches may have branch target prediction, where the target address is predicted.

The fetch control unit 12 may, in some embodiments, implement other speculative structures for fetch address generation. For example, a fetch address predictor may be trained on a speculative instruction stream, and look ups in the predictor may be used for each fetch address to predict the next fetch address. Various branch predictors, such as the branch direction predictor 20, may be used to validate the fetch address predictor and to train the fetch address predictor. Subsequent branch execution may validate the branch predictors, and may be used to train the branch predictors.

The instruction cache 14 may be configured to fetch instructions from the fetch address, and provide the instructions to the execution core 16. In one embodiment, the instruction cache 14 may be configured to provide a fetch group of instructions. The fetch group may be defined as a group of instructions beginning at the fetch address. The number of instructions or the number of bytes in a fetch group may be fixed, even if the fetch group crosses a cache line boundary in the instruction cache 14. That is, the instruction cache 14 may be configured to output instructions from both the cache line addressed by the fetch address and the next consecutive cache line, assuming both cache lines are a hit in the cache. The next consecutive cache line may be the cache line that would abut the current cache line in main memory (i.e. the next numerically higher fetch address on a cache line granularity). The instruction cache 14 may be banked, and the portions of the current cache line and the next consecutive cache line that may form a fetch group are stored in different banks Index generation may also be altered such that the next consecutive index is generated when the fetch group may extend across a cache line boundary (or the next consecutive index may be unconditionally generated, but may only be used in the cache that the fetch group extends across the cache line boundary). While the fetch group is fixed in size, the actual number of instructions used from a fetch group may vary. For example, a predicted-taken conditional branch or unconditional branch may cause the subsequent instructions from the fetch group to be discarded.

In an embodiment, the branch direction predictor 20 may implement a Perceptron-based prediction scheme. In a Perceptron-based predictor, multiple branch predictor tables may be indexed for a given fetch address, and each table may output a branch predictor value. The branch predictor value may be a signed weight, for example. The branch predictor value output from each table may be summed together to produce a summed branch predictor value. The sign of the sum may be used to predict the direction. In one particular embodiment, the branch direction predictor 20 may be based on an Optimized Geometric History Length (O-GEHL) predictor. Additional details of one embodiment are described further below.

The O-GEHL predictor may be trained in response to mispredictions, and may also be trained when the summed branch predictor value is near zero (i.e. within a threshold of zero). For example, the summed branch predictor value may be near zero when the absolute value of the summed branch predictor value is less than a specified threshold. The threshold may be fixed or programmable, in various embodiments. When the summed branch predictor value is near zero, the prediction may be susceptible to changing the direction of the prediction. That is, a small update of the predictor values in the other direction may change the sign of the sum and thus the prediction. Accordingly, training on correct prediction when the summed branch predictor value is near zero may strengthen the prediction and help prevent the change in direction of the prediction when the current direction prediction is correct.

In the illustrated embodiment, the branch direction predictor 20 may be configured to transmit a weak prediction update indication for each branch prediction. The weak prediction update indication may indicate that the summed branch predictor value is within a threshold of zero. If the branch prediction is correct, the branch direction predictor 20 may still be trained to strengthen the prediction. The branch direction predictor 20 may be configured to make the determination that the prediction is weak (and should be trained on correct prediction) at the time the prediction is made. The weak prediction update indications may be transmitted with the branch instructions, and may cause the branch execution unit 18 to request an update even if the prediction is correct. By identifying the weak predictions at the time the prediction is made, and transmitting the weak prediction update indications with the branch instructions, a branch direction predictor read may be avoided at branch prediction verification/training time if the prediction is correct and the prediction is not weak. The competition for access to the branch direction predictor 20 may be reduced. In some embodiments, the branch direction predictor 20 may be implemented with a single port to the branch prediction tables, which may be shared between the training reads and the prediction reads. The inventors have discovered that identifying the weak predictions at prediction time rather than verification/training time does not significantly impact the accuracy of the predictor, and reduces the number of reads of the predictor.

In one embodiment, the branch direction predictor 20 may be configured to provide a branch prediction for each potential branch instruction in the fetch group (and may also provide weak prediction update indications for each potential branch instruction in the fetch group). Accordingly, each entry in the branch direction predictor 20 may store a number of branch predictions equal to a number of instructions that may reside in the cache line. The branch direction predictor may be banked in at least two banks Based on the offset of the fetch address, one or more banks at the index generated from the fetch address and zero or more banks at the next index may be read to select the branch prediction values for the fetch group. The branch predictions that actually correspond to branch instructions in the fetch group may be identified later in the pipeline by offset from the beginning of the fetch group. In an embodiment, the processor 10 may be configured to execute two instruction sets. The first instruction set may have fixed length instructions (e.g. 32 bits, or 4 bytes). Each entry of the branch direction predictor may store a branch prediction for each potential instruction in the cache line according to the first instruction set. The second instruction set may have both 16 bit (2 byte) and 32 bit (4 byte) instructions. Thus, there are more potential instructions in the same sized cache line for the second instruction set. However, it is infrequent that branch instructions are adjacent in the instruction stream. Accordingly, the same set of branch predictors may be used for the second instruction set as are used for the first instruction set. Alternatively, the set of branch predictors stored in a given entry may include sufficient predictors to predict each potential branch instruction in the second instruction set as well.

The instruction cache 14 may have any construction, configuration, and size. For example, the instruction cache 14 may be set associative, direct mapped, or fully associative. Cache lines may be of any size as well (e.g. 32 bytes, 64 bytes, etc.).

The execution core 16 may be coupled to receive the instructions from the instruction cache 16 (and weak prediction update indications from the branch direction predictor 20) and may be configured to execute the instructions. The execution core 16 may include any execution hardware, including circuitry to decode instructions into one or, in some embodiments, multiple ops to be executed. The execution hardware may further include circuitry to perform register renaming (for embodiments that implement register renaming). The execution hardware may further include circuitry to schedule, execute, and retire instructions. The execution core 16 may be pipelined and/or superscalar. The schedule circuit may implement centralized scheduling (e.g. a scheduler that issues ops and retires ops) or distributed scheduling (e.g. reservation stations for issuing ops and a reorder buffer for retiring ops). The execution hardware may include execution units of various types, including the branch execution unit 18. There may be one or more of each type of execution unit in various embodiments. The execution hardware may include speculative and/or out-of-order execution mechanisms, or in-order execution mechanisms, in various embodiments. The execution hardware may include microcoding, in some embodiments. Any configuration of the execution core 16 may be implemented.

As mentioned previously, the branch execution unit 18 may be configured to execute branch instructions. Branch instruction execution may include evaluating a condition or conditions specified by a conditional branch, and determining a taken/not-take result based on the evaluation. If the target address is generated using more than one value (e.g. a displacement and fetch address), the branch execution unit 18 may be configured to generate the target address. Any branch predictions may be validated. If there is a misprediction, the branch execution unit 18 may be configured to signal the fetch control unit 12 to begin fetching the correct address. There may also be signalling within the processor's pipelines to purge instructions that are subsequent to the mispredicted branch instruction (and thus are not part of the correct instruction stream based on the branch execution).

Additionally, if the branch direction is mispredicted or the weak prediction update indication associated with the branch indicates update, the branch execution unit 18 may be configured to transmit an update request to the branch direction predictor 20. The update request may include the fetch address of the branch instruction, and may also include corresponding branch history used to generate the indexes to the branch predictor tables. Alternatively, the branch history may be stored locally by the branch direction predictor 20, or the indexes may be carried with the branches and provided as part of the update request. The update request may further indicate the taken/not taken result and a indication of whether the branch was mispredicted or weakly predicted.

It is noted that, while the branch execution unit 18 is shown as part of the execution core 16 in the embodiment of FIG. 1, other embodiments may implement the branch execution unit further up the instruction execution pipeline, if desired. For example, the branch execution unit 18 may be part of the fetch control unit 12, and may receive input conditions from the execution core 16 for evaluation of conditional branches.

Figure 2:
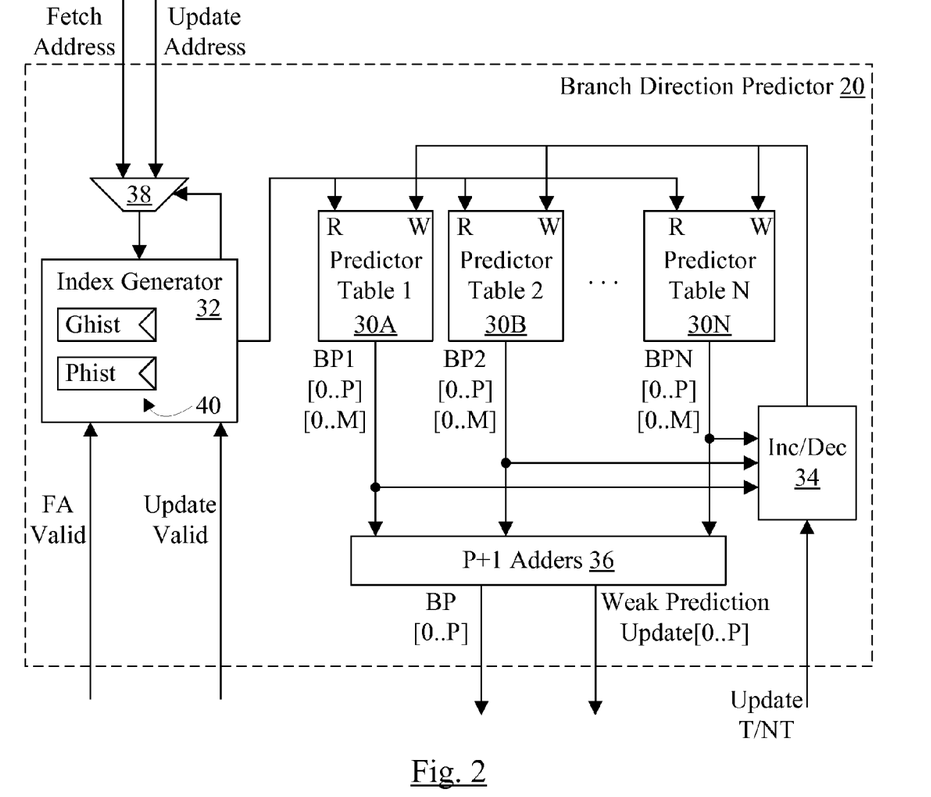
FIG. 2 is a block diagram of one embodiment of a branch direction predictor.

Turning next to FIG. 2, a block diagram of one embodiment of the branch direction predictor 20 is shown. In the embodiment of FIG. 2, the branch direction predictor 20 includes a set of predictor tables 30A-30N, an index generator 32, an increment/decrement unit 34, a set of P+1 adders 36, and a mux 38. The mux 38 is coupled to receive a fetch address generated by the fetch control unit 12 and an update address from the branch execution unit 18. The mux 38 may be coupled to receive a selection control from the index generator 32, which may be coupled to receive the selected address from the mux 38. The index generator 32 may be coupled to receive a fetch address valid (FA valid) signal indicating whether or not a valid fetch address is input to the mux 38, and an update valid signal from the branch execution unit 18 indicating that the update address is valid. The index generator 32 includes history storage 40 storing various branch history used to generate indexes for the predictor tables 30A-30N. The index generator 32 is coupled to provide indexes to read ports (R) on the predictor tables 30A-30N. The predictor tables 30A-30N are configured to output branch prediction values (BP1 to BPN) to the adders 36 and to the increment/decrement unit 34. The increment/decrement unit 34 is coupled to receive an update taken/not taken result from the branch prediction execution unit 18. The increment/decrement unit 34 is configured to provide the updated branch prediction values to the write ports on the predictor tables 30A-30N. Both M and P in FIG. 2 may be integers greater than zero.

If the fetch address is valid, the index generator 32 may be configured to select the fetch address for index generation. If the fetch address is not valid and the update address is valid, the index generator 32 may be configured to select the update address for index generation. If both addresses are valid at the same time, there may be a pipeline stage to capture the update address (and corresponding taken/not taken result) for update in a subsequent clock cycle.

The index generator 32 may be configured to generate a different index for each predictor table 30A-30N. In an embodiment implemented based on O-GEHL, the index for each table may include a different amount of branch history (global and path). Specifically, a geometrically increasing among of global history and geometrically increasing (but capped) amount of path history may be used for each successive index generation. In an embodiment, the index for the predictor table 30A may be generated from only fetch address bits. The index for the predictor table 30B may be generated from fewer address bits, along with some global history and path history bits. The index for the next predictor table may be generated from still fewer address bits, along with still more global history and path history bits. The number of path history bits may be capped, and there may be a floor to the reduction in the number of address bits. Additional details for an embodiment of the index generation are provided further below. Generally, the global history and path history may be generated from the target addresses of taken branches. In one embodiment, the global history may be left shifted and XORed with the target address of the next taken branch. The path history may be left shifted by one bit and a selected least significant bit of the target address may be shifted in to the least significant bit of the path history. Alternatively, the path history may be left shifted by more than one bit and an equal number of bits may be shifted in from the target address of the next taken branch.

The index generator 32 may provide each index to the respective read port of the corresponding predictor table 30A-30N. Each predictor table 30A-30N may output a branch predictor value to be used to generate a branch predictor. More particularly, each branch predictor value may be an M+1 bit signed weight. The weights may be added by the adders 36 and the sign of the resulting sum may indicate the direction prediction (e.g. taken if positive, not taken if negative, or vice versa).

In the illustrated embodiment, each predictor table may be configured to output P+1 branch predictor values, corresponding to P+1 potential branches in a fetch group. Each of the P+1 branch predictor values corresponds to the position of an instruction in the fetch group of the first instruction set. That is, there may be P+1 instructions in a fetch group. Accordingly, P+1 branch predictions (taken/not taken) may be output by the adders 36 by adding the branch predictor values corresponding to a given position in the fetch group. The branch predictions are output by the adders 36 (BP[0 . . . P] in FIG. 2) and may be associated with the P+1 instructions in the fetch group by position.

Additionally, as mentioned previously, the branch direction predictor 20 may be configured to detect which predictions are weak (e.g. within a threshold of zero) at prediction time. For example, the adders 36 may include circuitry to compare the resulting sums to the threshold value, to generate the corresponding weak prediction update indications. The indications may be asserted to indicate update (weak prediction) and deasserted to indicate no update.

The adders 36 may be configured generate predictions in response to a fetch address input. If an update address was presented to the index generator 32, the branch predictor values from the tables may be presented to the increment/decrement unit 34 for update. The increment/decrement unit 34 may be configured to either increment or decrement the branch predictor values corresponding to the branch that was mispredicted (or correctly predicted with a weak update indication asserted). Thus, the offset of the branch within the fetch group may be identified to identify which branch predictor values to update.

In an embodiment in which the positive sign of the sum indicates a taken prediction, the branch predictor values may be incremented in response to a taken branch and decremented in response to a not-taken branch. Other embodiments may define a positive sign to indicate not taken, in which case the branch predictor values may be incremented in response to a non-taken branch and decremented in response to a taken branch.

The modified branch predictor values (and unmodified values from the same entry) may be returned to the write port on the predictor tables 30A-30N for update into the memory. The index generator 32 may be configured to supply the same indexes used for the read to the write port to update the correct entries.

It is noted that, while the embodiment described above implements both the weak prediction update indicators transmitted with the predicted branch instructions and the generation of predictions for each potential branch instruction in a fetch group, other embodiments may implement one or the other feature. For example, embodiments which implement only predicting each potential branch, but which read the predictor at branch training time to determine if the prediction is weak for a correctly predicted branch may be implemented. Similarly, embodiments which only predict one branch direction but which make the weak prediction update determination at the time of prediction may be implemented.

Figure 3:
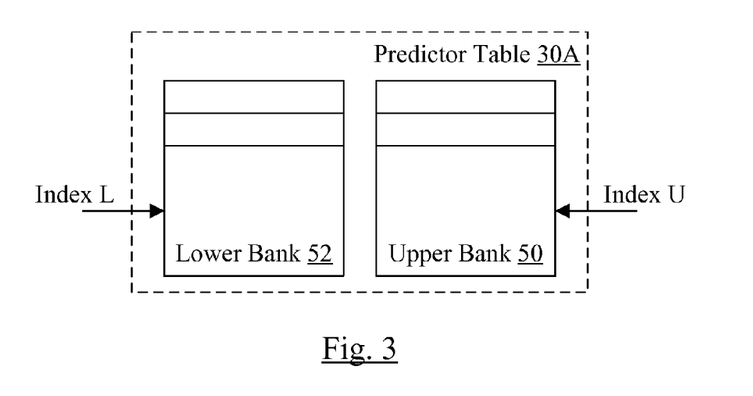
FIG. 3 is a block diagram of one embodiment of a branch predictor table shown in FIG. 2.

FIG. 3 is a block diagram illustrating one embodiment of a predictor table 30A. Other predictor tables 30B-30N may be similar. The embodiment of FIG. 3 illustrates the banking of the predictor table 30A into at least two banks: an upper bank 50 and a lower bank 52. Each entry in the predictor table 30A may include a portion in the upper bank 50 and a portion in the lower bank 52. Instruction execution order may begin in the lower bank 52 and progress upward to the upper bank 54. Thus, the predictions of the entry (corresponding to a cache line of instructions) may be evenly divided in the embodiment of FIG. 3. That is, half of the predictions for a cache line may be in the lower bank 52 and the other half of the predictions may be in the upper bank 54.

The index generator 32 may be configured to generate separate indexes for each bank: index L for the lower bank 52 and index U for the upper bank 50. If the offset of the fetch address identifies a byte in the lower half of the cache line, corresponding to a prediction in the lower bank 52, then both indexes may be equal and the two halves of the same entry may be read/written. On the other hand, if the offset of the fetch address identifies a byte in the upper half of the cache line, corresponding to a prediction in the upper bank 50, then the index U for the upper bank 50 may be generated as described above. The index L for the lower bank 52 may be generated as the upper bank index plus one, selecting the next consecutive entry in the predictor table 30A (corresponding to the next consecutive cache line to the cache line being fetched).

It is noted that, while an upper bank 50 and lower bank 52 are illustrated in FIG. 3, other embodiments may implement more than two banks. If a fetch group covers less than half a cache line, for example, power may be saved by using more than two banks because there would be cases in which at least one bank would be idle for a read or write operation.

Index generation for one embodiment is now described in more detail. According to the O-GEHL algorithm, one selects the minimum (floor) address bits, minimum and maximum global history bits, and the cap on path history bits to use for the predictor. The number of global history bits to use for index generation for a given predictor table i may be determined from the equations given below (if the minimum global history bits, used for the predictor table 30B, is L(1) and the maximum global history bits is L(N−1) for N tables, wherein N is an integer greater than zero):

$$\text{alpha} = (L(N-1)/L(1))^{1/N-2}$$

$$L(i) = \text{alpha}^{i-1} * L(1)$$

The number of path history bits is the lesser of L(i) and the selected cap. The path history bits, address bits, and global history bits may be concatenated, and the resulting value may be hashed to generate the index.

In order to keep the amount of logic generating the index small (and fast) in some embodiments, the number of bits used in the hash may be limited to a multiple of the index width in bits. That is, each index bit may be generated from a number of bits of the concatenated value, wherein the number of bits is equal to the multiple. For example, the multiple may be selected as 3, and the hash function may be a three input exclusive OR (XOR) of bits from the concatenated value to each bit of index value. As the number of global history bits grows (and the number of address bits is reduced to the minimum), the total number of bits in the concatenated value becomes larger than the multiple times the width of the index. In such cases, the concatenated value may be sampled at an interval defined by the ratio of the number of bits in the concatenated value and the multiple times the width. The selected bits may also be right-rotated to further modify the indexes generated for each predictor table.

The address bits used in the index generation may exclude the bits that define the offset within a cache line. That is, since an entry in the predictor tables 30A-30N includes branch predictor values for a full cache line, the offset within the cache line identifies a beginning point within the branch predictor values for a fetch group, not a determination of the entry to select. In other embodiments, offset bits may be used in the index generation but may also be used to select branch prediction values from the entry (and possibly the next consecutive entry).

Figure 4:
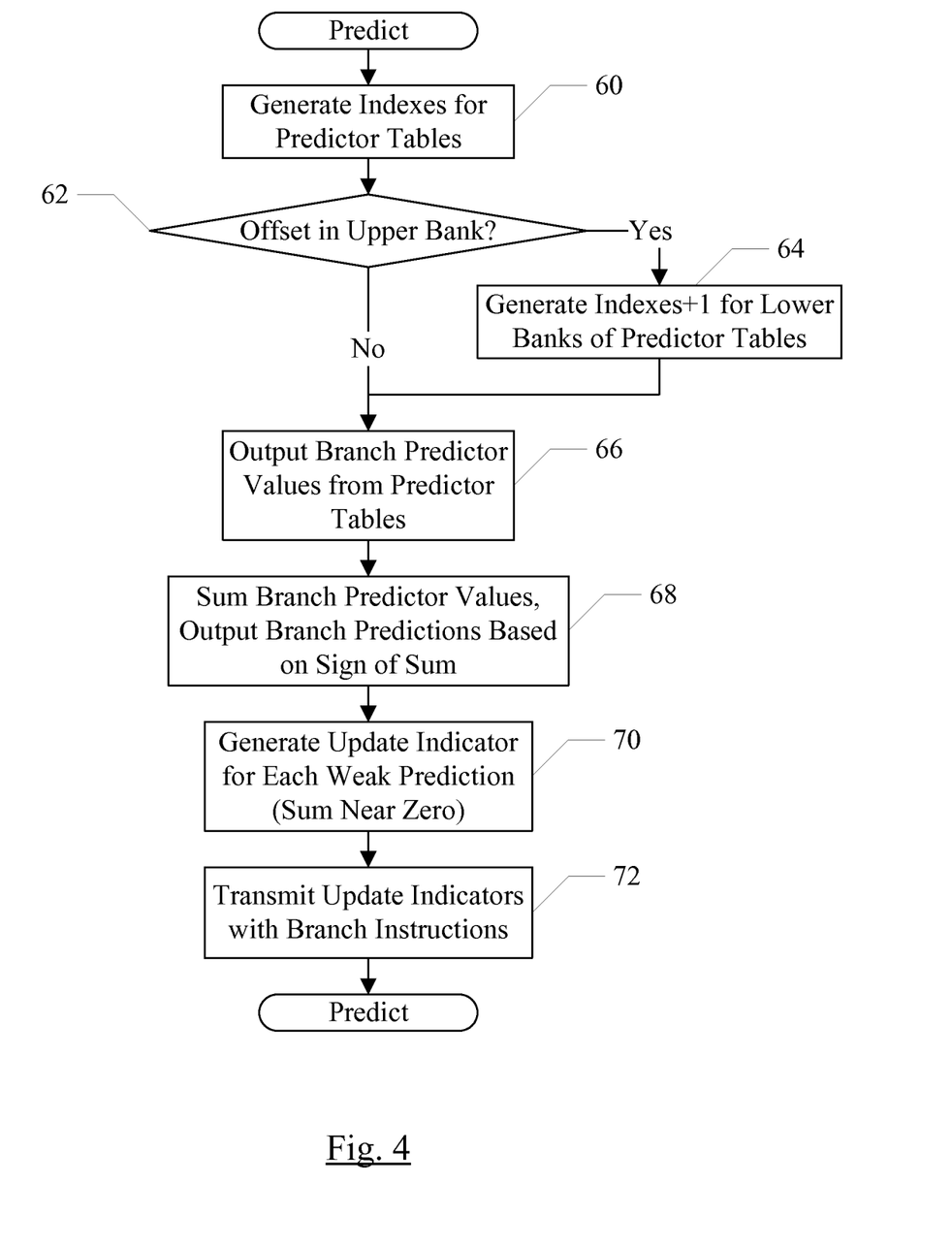
FIG. 4 is a flowchart illustrating operation of one embodiment of the branch direction predictor shown in FIG. 2 during prediction of a branch.

Turning next to FIG. 4, a flowchart is shown illustrating operation of one embodiment of the branch direction predictor 20 to generate a branch direction prediction. While the blocks are shown in a particular order for ease of understanding, other orders may be used. Blocks may be performed in parallel in combinatorial logic circuitry in the branch direction predictor 20. Blocks, combinations of blocks, and/or the flowchart as a whole may be pipelined over multiple clock cycles. The branch direction predictor 20 and components thereof as shown in FIG. 2 may be configured to implement the operation shown in FIG. 4.

The index generator 32 may be configured to generate the indexes for the predictor tables (block 60). As mentioned previously, each index may be generated from a different combination of address, global history, and path history bits (although the sets of bits used for each index may overlap). If the offset of the fetch address is in the upper bank 50 of the indexed entries, the index generator 32 may be configured to generate the indexes+1 for the lower banks of the predictor tables (decision block 62, "yes" leg and block 64). Otherwise, the same index may be used in each predictor table for the upper bank and the lower bank.

The predictor tables may be configured to output predictor values from the indexed entry (or entries, if the fetch group crosses a cache line boundary) (block 66). The adders 36 may be configured to add the branch predictor values from each predictor table that correspond to a given position within the fetch group, outputting corresponding branch predictions for each position based on the sign of the corresponding sum (block 68). Additionally, the adders 36 may generate the update indicators for each weak prediction (sum of branch prediction values near zero, e.g. within a threshold of zero—block 70). The branch direction predictor 20 may be configured to transmit the branch predictions and update indicators with the corresponding instructions (block 72).

Figure 5:
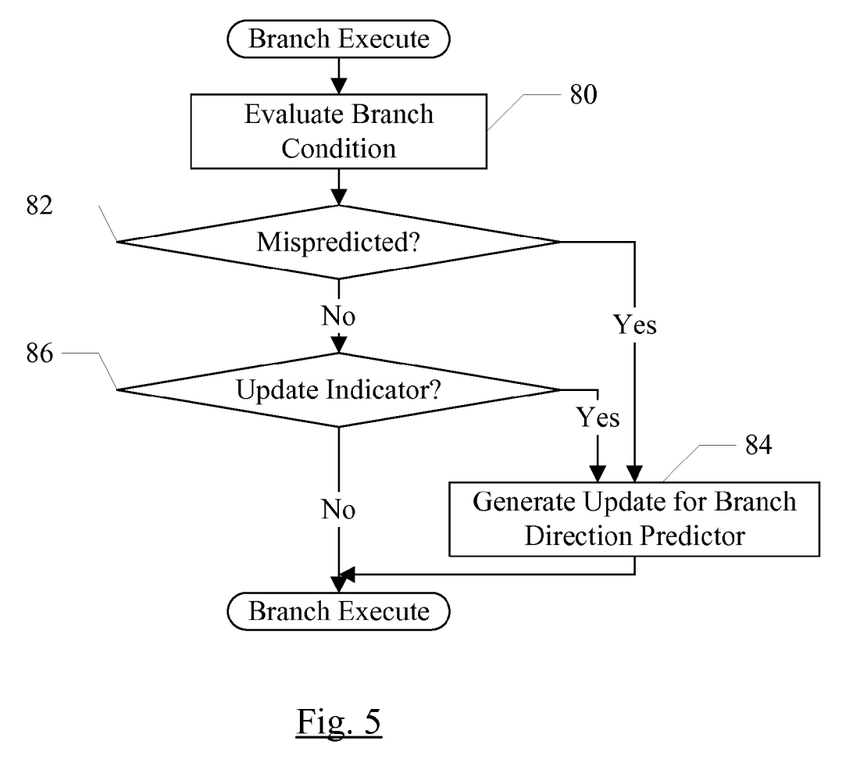
FIG. 5 is a flowchart illustrating operation of one embodiment of a branch execution unit shown in FIG. 1 during execution of a branch.

FIG. 5 is a flowchart illustrating operation of one embodiment of the branch execution unit 18 to execute a conditional branch operation. While the blocks are shown in a particular order for ease of understanding, other orders may be used. Blocks may be performed in parallel in combinatorial logic circuitry in the branch execution unit 18. Blocks, combinations of blocks, and/or the flowchart as a whole may be pipelined over multiple clock cycles. The branch execution unit 18 may be configured to implement the operation shown in FIG. 5.

The branch execution unit 18 may be configured to evaluate the condition or conditions specified by the branch operation to determine if the branch is taken or not taken (block 80). The conditions may be condition code selected from a condition code register, condition codes forwarded from another operation, or the result of a comparison specified by the branch operation, for example. If the branch direction is mispredicted (e.g. predicted taken but determined to be not taken or vice versa) (decision block 82, "yes" leg), the branch execution unit 18 may be configured to generate an update for the branch direction predictor (block 84). The update may include the address of the branch, the update valid signal indicating that an update is being transmitted, and taken/not taken result of the branch. Additionally, if the branch is correctly predicted but the update indicator indicates update (decision block 82, "no" leg and decision block "86", yes leg), the branch execution unit 18 may be configured to generate the update for the branch direction predictor 20 (block 84). It is noted that the misprediction update and the update due to the update indicator may be independent of each other. That is, it is not necessary to determine that the prediction is correct to generate the update in response to the update indicator. Rather, the update due to the update indicator may occur even if the branch is correctly predicted.

Figure 6:
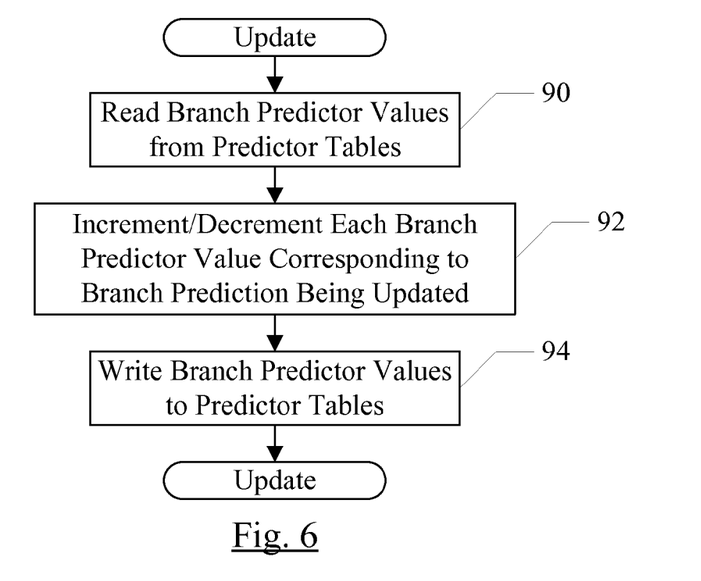
FIG. 6 is a flowchart illustrating operation of one embodiment of the branch direction predictor shown in FIG. 2 in response to a branch update request.

FIG. 6 is a flowchart illustrating operation of one embodiment of the branch direction predictor 20 to update a branch prediction in response to an update request from the branch execution unit 18. As mentioned previously, the update request may be generated by the branch execution unit 18 responsive to a misprediction of a branch or an update indicator corresponding to the branch indicates the update. While the blocks are shown in a particular order for ease of understanding, other orders may be used. Blocks may be performed in parallel in combinatorial logic circuitry in the branch direction predictor 20. Blocks, combinations of blocks, and/or the flowchart as a whole may be pipelined over multiple clock cycles. The branch direction predictor 20 and components thereof as shown in FIG. 2 may be configured to implement the operation shown in FIG. 6.

The branch direction predictor 20 may read the branch predictor values from the predictor tables 30A-30N (block 90). Reading the branch predictor values may include generating the indexes (and possibly different lower bank indexes if the fetch group crossed a cache line boundary) for the predictor tables 30A-30N, similar to the original read of the branch predictor values for prediction. The index generator 32 may be configured to checkpoint global branch history and path history for each branch to permit recreation of the indexes, or these values may be carried with the branch instructions and returned as part of the update requests. Alternatively, the indexes as generated during the read may be checkpointed in the index generator 32 or carried with the branch instruction and returned as part of the update requests in addition to the update address or instead of the update address.

The branch predictor values may be provided to the increment/decrement unit 34, which may be configured to increment each branch predictor value associated with the branch if the branch result is taken, or decrement each branch predictor value associated with the branch if the branch result is not taken, for embodiments which interpret a positive sign of the sum as predicted taken. For embodiments in which a positive sign of the sum is not taken, the increment/decrement unit 34 may be configured to increment each branch predictor value associated with the branch if the branch result is not taken, or decrement each branch predictor value associated with the branch if the branch result is taken (block 92). The increment/decrement unit 34 may provide the update branch predictor values on the write ports of the predictor tables 30A-30N, which may write the update branch predictor values to the indexed entries (block 94).

Figure 7:
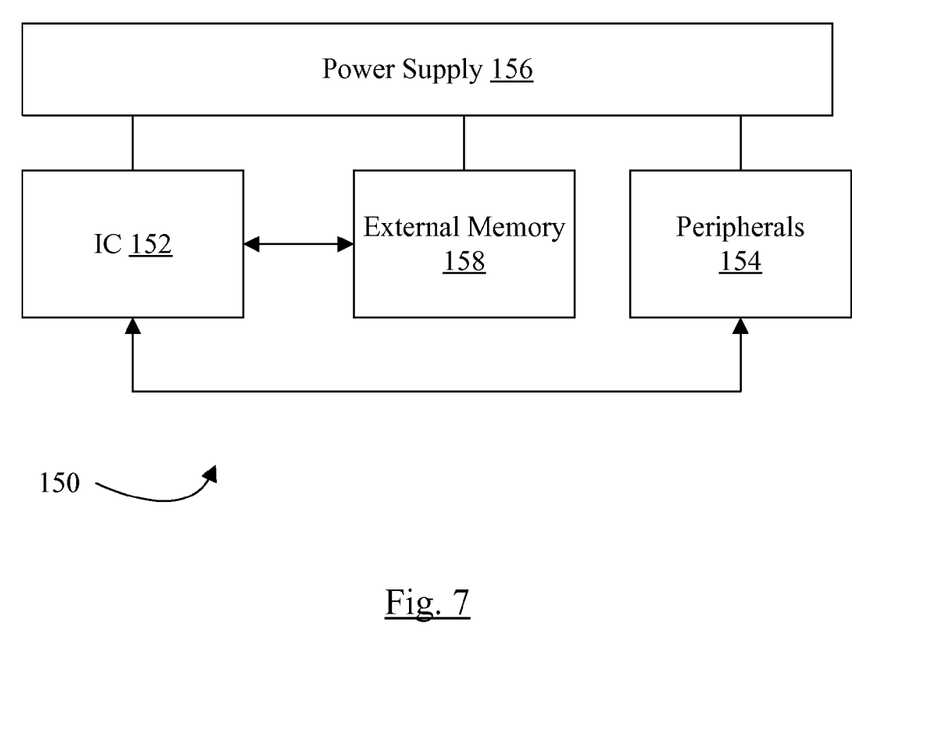
FIG. 7 is a block diagram of one embodiment of a system.

Turning now to FIG. 7, a block diagram of one embodiment of a system 150 is shown. In the illustrated embodiment, the system 150 includes at least one instance of an integrated circuit 152 (which may include at least one instance of the processor 10 shown in FIG. 1) coupled to one or more peripherals 154 and an external memory 158. A power supply 156 is provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well). The integrated circuit 152 may be a system on a chip (SOC) including one or more instances of the processor 10 and other circuitry such as a memory controller to interface to the external memory 158 and/or various on-chip peripherals.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the integrated circuit 152 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A branch predictor having a fetch address input on which a fetch address is received during use, wherein the fetch address is also input to an instruction cache to fetch instructions, the branch predictor comprising:

a plurality of branch predictor tables, each branch predictor table indexed using a different index generated from a different combination of the fetch address, a path history, and a global history, wherein each branch predictor table comprises a plurality of entries, wherein each entry of the plurality of entries corresponds to a cache line in the instruction cache, and wherein a fetch group that begins at the fetch address crosses a cache line boundary for at least some values of the fetch address, and wherein a selected entry of the plurality of entries is selected in response to the different index provided to the branch predictor table, and wherein the selected entry and a consecutive entry of the branch predictor table each store a plurality of branch prediction values that correspond to potential branches in the cache lines that correspond to the selected entry and the consecutive entry, and wherein a subset of the plurality of branch prediction values from the selected entry and the plurality of branch prediction values from the consecutive entry are selected responsive to the fetch address and are combined to form a plurality of branch predictions corresponding to potential branches in the fetch group, wherein the subset corresponds to portions of the corresponding cache lines that are within the fetch group; and a control circuit coupled to the plurality of branch predictor tables and configured to generate the indexes and select the plurality of branch prediction values.

2. The branch predictor as recited in claim 1 wherein the plurality of branch predictions are direction predictions.

3. The branch predictor as recited in claim 2 wherein the control circuit is configured to detect which direction predictions are to be updated due to the direction predictions being within a threshold of changing direction, and wherein the control circuit is configured to transmit an indication of the threshold update with the branch predictions.

4. The branch predictor as recited in claim 1 wherein each predictor table is banked into at least two banks, and wherein the subset of the plurality of branch prediction values read from the selected entry are read from one bank of the at least two banks, and wherein the subset of the plurality of branch prediction values read from the consecutive entry are read from a different bank of the at least two banks.

5. The branch predictor as recited in claim 4 wherein the control circuit is configured to select the plurality of branch prediction values from the banks of the selected entry responsive to a fetch group that does not cross the cache line boundary.

6. A branch predictor having a fetch address input on which a fetch address is received during use, wherein the fetch address is also input to an instruction cache to fetch instructions, the branch predictor comprising:

a plurality of branch predictor tables, each branch predictor table indexed using a respective index generated from a different combination of the fetch address, a path history, and a global history, wherein each branch predictor table is configured to output a plurality of branch prediction values in response to the respective index, and wherein a number of the branch prediction values from each branch prediction table is equal to a number of instructions that are included in a fetch group for a first instruction set implemented by a processor that includes the branch predictor, even for a case that the fetch group crosses a cache line boundary of the instruction cache included in the processor and causes branch prediction values to be read from multiple entries in each branch predictor table, and wherein the plurality of branch prediction values from each of the plurality of branch prediction tables are combined to generate a plurality of branch predictions for potential branch instructions in the fetch group; and a control circuit coupled to the plurality of branch predictor tables and configured to generate the indexes and select the plurality of branch prediction values.

7. The branch predictor as recited in claim 6 wherein the control circuit is configured to sum respective ones of the plurality of branch prediction values from the plurality of branch predictor tables to generate each branch prediction of the plurality of branch predictions.

8. The branch predictor as recited in claim 7 wherein a sign of the sum indicates a branch direction prediction for the respective instruction.

9. The branch predictor as recited in claim 6 wherein the processor that includes the branch predictor further implements a second instruction set, and wherein the number of the plurality of branch predictions is less than a maximum number of instructions in a fetch group from the second instruction set.

10. A method comprising:
   fetching instructions from an instruction cache responsive to a fetch address;
   indexing each of a plurality of branch predictor tables using a different index generated from a different combination of the fetch address, a path history, and a global history, wherein:
      each branch predictor table comprises a plurality of entries,
      each entry of the plurality of entries corresponds to a cache line in the instruction cache, and
      a fetch group that begins at the fetch address crosses a cache line boundary for at least some values of the fetch address;
   selecting a selected entry of the plurality of entries in response to the different index provided to the branch predictor table, wherein:
      the selected entry and a consecutive entry of the plurality of entries each store a plurality of branch prediction values that correspond to potential branches in the cache lines that correspond to the selected entry and the consecutive entry; and
      a subset of the plurality of branch prediction values from the selected entry and the plurality of branch prediction values from the consecutive entry are selected responsive to the fetch address and are combined to form a plurality of branch predictions corresponding to potential branches in the fetch group.

11. The method as recited in claim 10 wherein the plurality of branch predictions are direction predictions.

12. The method as recited in claim 11 further comprising:
   detecting which direction predictions are to be updated due to the direction predictions being within a threshold of changing direction; and
   transmitting an indication of the threshold update with the branch predictions.

13. The method as recited in claim 10 wherein each branch predictor table is banked into at least two banks, and the method further comprises:
   reading, from one bank of the at least two banks, the subset of the plurality of branch prediction values from the selected entry; and
   reading, from a different bank of the at least to banks, the subset of the plurality of branch prediction values from the consecutive entry.

14. The method as recited in claim 13 further comprising:
   detecting that a second fetch group does not cross the cache line boundary; and
   selecting the plurality of branch prediction values from the banks of the selected entry responsive to detecting that fetch group that does not cross the cache line boundary.

15. The method as recited in claim 13 further comprising:
   generating a plurality of branch predictions responsive to the plurality of branch prediction values from each branch predictor table.

16. The method as recited in claim 15 wherein the generating comprises summing respective ones of the plurality of branch prediction values from the plurality of branch predictor tables to generate each branch prediction of the plurality of branch predictions.

17. The method as recited in claim 16 wherein a sign of the sum indicates a branch direction prediction for the respective instruction.

* * * * *